United States Patent
Meng et al.

(10) Patent No.: US 11,156,458 B2
(45) Date of Patent: Oct. 26, 2021

(54) MEMS GYROSCOPE AND ELECTRONIC DEVICE INCLUDING THE SAME

(71) Applicant: AAC Acoustic Technologies (Shenzhen) Co., Ltd., Shenzhen (CN)

(72) Inventors: Zhenkui Meng, Shenzhen (CN); Yuwei Liu, Cavendish (SG)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 79 days.

(21) Appl. No.: 16/708,428

(22) Filed: Dec. 9, 2019

(65) Prior Publication Data
US 2020/0208973 A1    Jul. 2, 2020

(30) Foreign Application Priority Data
Dec. 27, 2018   (CN) .......................... 201811615486.4

(51) Int. Cl.
*G01C 19/5656* (2012.01)
*G01P 15/14* (2013.01)

(52) U.S. Cl.
CPC .......... *G01C 19/5656* (2013.01); *G01P 15/14* (2013.01)

(58) Field of Classification Search
CPC .. G01C 19/5656; G01C 19/5733; G01P 15/14
See application file for complete search history.

(56) References Cited

U.S. PATENT DOCUMENTS

| | | | |
|---|---|---|---|
| 7,231,824 B2 * | 6/2007 | French | G01C 19/5719 73/504.12 |
| 2015/0362317 A1 * | 12/2015 | Furuhata | G01C 19/5747 73/504.12 |
| 2017/0067742 A1 * | 3/2017 | Zotov | G01P 15/02 |

* cited by examiner

*Primary Examiner* — Xin Y Zhong
(74) *Attorney, Agent, or Firm* — W&G Law Group

(57) ABSTRACT

A MEMS gyroscope is provided. The MEMS gyroscope includes a weight provided with elastic assemblies at four corners thereof. The elastic assemblies are arranged in one of diagonal directions of the weight. An electronic device is also provided applying the gyroscope of the present invention.

9 Claims, 2 Drawing Sheets

MEMS GYROSCOPE AND ELECTRONIC DEVICE INCLUDING THE SAME

TECHNICAL FIELD

The present invention relates to a rotation sensitive device using a vibration member, and in particular, to a MEMS gyroscope and an electronic device including the same.

BACKGROUND

A Micro-Electro-Mechanical Systems (MEMS) gyroscope is a silicon micro-electromechanical system. Micro-Electro-Mechanical Systems indicate micro-electromechanical systems which integrate mechanical elements, micro-sensors, micro-actuators, signal processing and control circuits, interface circuits, communications, and power supplies.

Chinese Patent Publication No. 101907637 discloses a triaxial differential accelerometer (one kind of the MEMS gyroscopes) configured to generate structural layers of elements including a weight, an elastic element, a first movable electrode, a first fixed electrode and a first fixed block. The weight is parallel with and opposite to a first silicon substrate, and is suspended above the first silicon substrate by being connected to the elastic member. The weight supported by the elastic member moves in a direction parallel with the first silicon substrate. That is, the weight is limited to move in a direction of a surface thereof so as to detect an acceleration in an X axis direction and an acceleration in a Y axis direction (see paragraph 46 of the specification of the patent).

The elastic elements are connected to four corners of a square weight. The elastic element corresponding to each corner includes two zigzag elastic arms whose elastic deformation directions are parallel to a first axis direction and a second axis direction respectively. One end of the elastic arm is connected to the corner of the weight, another end of the elastic arm is fixedly connected to the first silicon substrate or a fixed part on the first silicon substrate (see paragraph 48 of the specification of the patent).

By providing two zigzag elastic arms in the X axis direction and the Y axis direction respectively, the accelerometer can better limit movements of the weight in the X axis direction and the Y axis direction and obtain a degree of sensitivity. However, a movement of the weight along a diagonal is not flexible enough.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

Reference signs: 1—weight; 11—movable electrode; 12—elastic assembly; 121—first hollow ring; 122—second hollow ring; 123—third hollow ring; 124—fourth hollow ring; 2—fixing frame; and 21—fixed electrode.

DESCRIPTION OF EMBODIMENTS

The present invention will be further illustrated with reference to the accompanying drawings and the embodiments.

Figure 1:
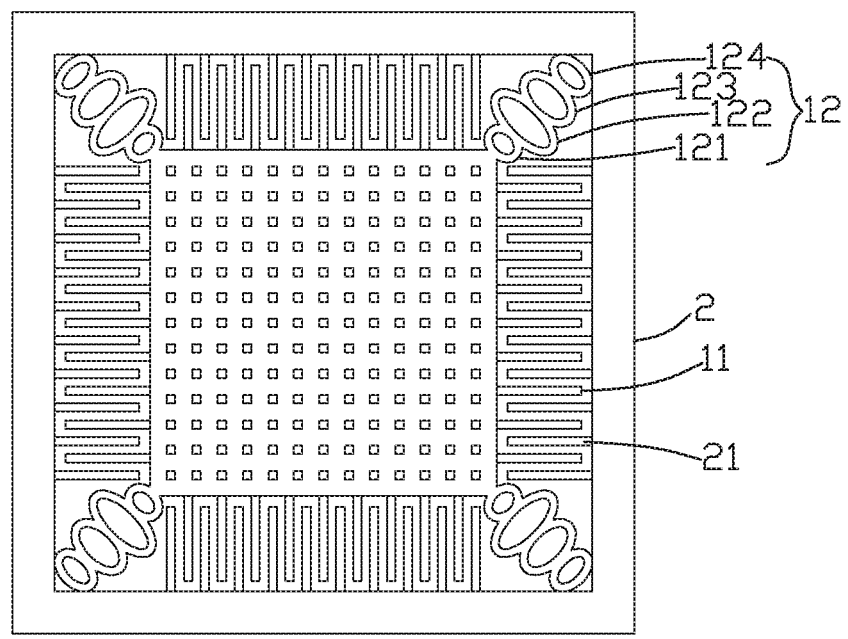
FIG. 1 is a front view of a MEMS gyroscope.
Figure 2:
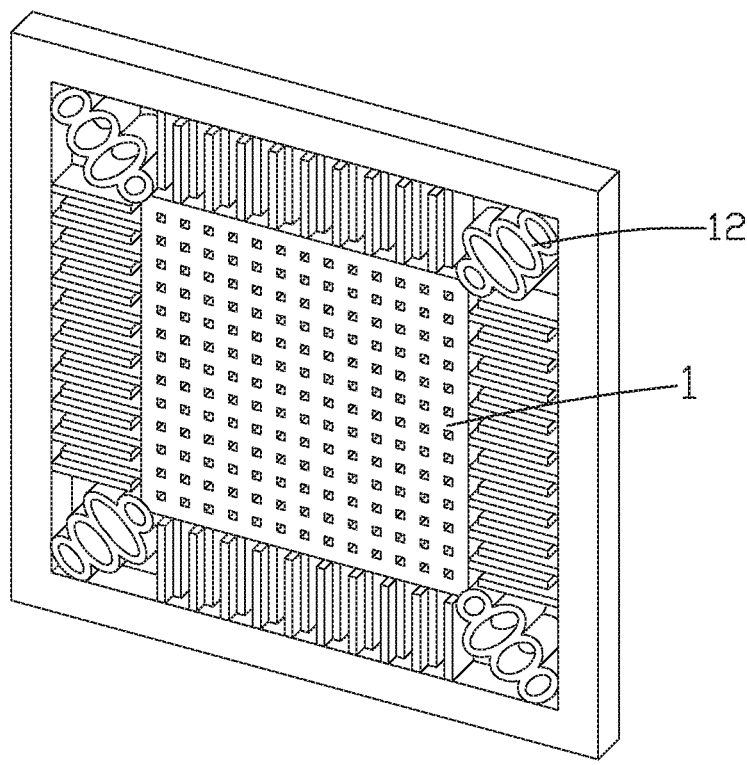
FIG. 2 is a top and bottom isometric projection of the MEMS gyroscope shown in FIG. 1.

As shown in FIGS. 1-2, a MEMS gyroscope of the present embodiment mainly includes a weight 1 and a fixing frame 2. Each of four corners of the weight is provided with an elastic assembly 12 along one of diagonal directions. Each of four sides of the weight 4 is provided with a movable electrode 11 extending outwardly and in a shape of a comb. An inner side of the fixing frame 2 extends inward to form a fixed electrode 21 that forms a capacitance effect with the movable electrode. Each movable electrode 11 is located between two adjacent fixed electrodes 21 and is parallel to and opposite to the fixed electrode 21. The fixed electrode and the movable electrode each are of a flat plate structure. The weight 1 is elastically connected to the fixing frame 2 through the elastic assembly 12. The weight can be moved on X axis and Y axis relative to the fixing frame. A capacitance is changed by changing a distance between one fixed electrode of the two adjacent fixed electrodes and the mobile electrode and a distance between the other fixed electrode of the two adjacent fixed electrodes and the mobile electrode, thereby inducing a movement and positional change of an electronic device on the X axis or the Y axis. In this embodiment, one end of the elastic assembly 12 is arranged at a corner of the weight 1, and another end thereof is fixed at an inner corner of the fixing frame 2, which is an optional embodiment. In optional embodiments, another end of the elastic assembly 12 can not be arranged on the fixing frame, for example, it can be fixed to a substrate supporting the weight.

It should also be understood that the structure of this embodiment can be applied to a biaxial MEMS gyroscope when only changes on X axis and Y axis is detected. When a Z axis detecting structure is added, it can also be applied to a triaxial MEMS gyroscope detecting changes on X axis, Y axis, and Z axis, or applied to other gyroscopes. Therefore, the structure of this embodiment is not limited to application of the biaxial MEMS gyroscope.

The elastic assembly 12 in this embodiment is formed of four hollow rings having an elasticity and arranged along one diagonal direction of the weight, and is formed into one piece with the weight by using a silicone material. When molding, for convenience of manufacture, annular segments of contact parts of four ring juxtaposed partially overlap, and a ring in contact with the weight also partially overlap with the weight.

It should be understood that, firstly, the elastic assembly adopts an elastic member (the number of the elastic member is four assemblies in the present embodiment) formed by multiple hollow rings arranged in one diagonal direction of the weight, which is only an optional embodiment obtained under concept of the present invention. This embodiment is better able to move the weight on X axis, Y axis, and a diagonal compared with providing elastic assembly only on the diagonal. The elastic assembly being of other structures can be used in other embodiments, as long as the elastic assembly is arranged on the diagonal of the weight. For example, providing a main deformation direction on the diagonal of the weight can allow the weight to be flexibly moved on X axis, Y axis and the diagonal, which is therefore considered to be within the scope of the present invention. Secondly, providing four hollow rings is only an optional embodiment of the present invention. In optional embodiments, for example, three, two, or even one hollow ring can be provided, which are within the scope of the present invention. Finally, an adaptive change can be made for a shape of the hollow ring as required.

In an optional embodiment, the four hollow rings of the elastic assembly 12 are a first hollow ring 121, a second hollow ring 122, a third hollow ring 123, and a fourth hollow ring 124. The shape, size and positional relationship of the four hollow rings are an optional design according to actual requirements. That is, the first hollow ring 121, the second hollow ring 122, the third hollow ring 123, and the fourth hollow ring 124 are sequentially arranged from inside to outside along one diagonal of the weight 1. A size of the first hollow ring 121 is smaller than a size of the second hollow ring 122. The size of the second hollow ring 122, a size of the third hollow ring 123 and a size of the fourth hollow ring 124 gradually decrease in sequence.

Finally, in order to obtain an optimal induction effect, the elastic assemblies 12 at four corners of the weight 1 in this embodiment adopt elastic assemblies having same shapes and same structures, which is considered as an optional embodiment. Elastic assemblies substantially similar to elastic assemblies or elastic assemblies having different structures for some specific requirements at four corners of the weight are also within the protection scope of the present invention.

The above are only preferred embodiments of the present invention. Here, it should be noted that those skilled in the art can make modifications without departing from the inventive concept of the present invention, but these shall fall into the protection scope of the present invention.

What is claimed is:

1. A Micro-Electro-Mechanical Systems (MEMS) gyroscope, comprising:
    a weight provided with elastic assemblies at four corners thereof,
    wherein each of the elastic assemblies is an elastic member formed by a plurality of hollow rings arranged in one of diagonal directions of the weight, the plurality of hollow rings comprises four hollow rings being a first hollow ring, a second hollow ring, a third hollow ring, and a fourth hollow ring that are sequentially arranged from inside to outside along one of diagonal directions of the weight, a size of the first hollow ring is smaller than a size of the second hollow ring, and the size of the second hollow ring, a size of the third hollow ring and a size of the fourth hollow ring gradually decrease in sequence.

2. The MEMS gyroscope as described in claim 1, wherein the elastic assemblies consisting of the plurality of hollow rings and the weight are formed into one piece.

3. The MEMS gyroscope as described in claim 1, wherein the weight and the elastic assemblies are formed into one piece by using a silica gel material.

4. The MEMS gyroscope as described in claim 1, wherein the weight and the elastic assemblies are formed into one piece by using a silica gel material.

5. The MEMS gyroscope as described in claim 2, wherein the weight and the elastic assemblies are formed into one piece by using a silica gel material.

6. The MEMS gyroscope as described in claim 1, wherein the elastic assemblies at the four corners of the weight have same shapes and same structures.

7. The MEMS gyroscope as described in claim 1, further comprising:
    a fixing frame having a rectangular ring structure, wherein the weight is of a rectangular structure and is located at an inner side of the fixing frame, each of the elastic assemblies has one end arranged at one of the four corners of the weight and another end fixed at an inner corner of the fixing frame.

8. The MEMS gyroscope as described in claim 7, wherein the fixing frame comprises a plurality of fixed electrodes arranged between two adjacent elastic assemblies of the elastic assemblies; and
    the weight further comprises a plurality of movable electrodes, wherein the plurality of movable electrodes is in a one-to-one correspondence with the plurality of fixed electrodes, and both each of the plurality of fixed electrodes and each of the plurality of movable electrodes are of flat plate structures.

9. An electronic device, comprising the MEMS gyroscope as described in claim 1.

* * * * *